(12) United States Patent
Dittmar et al.

(10) Patent No.: US 7,606,786 B2
(45) Date of Patent: Oct. 20, 2009

(54) METHOD AND DEVICE FOR SIMULATING PROCESS FLOWS IN THE GRAPHIC INDUSTRY

(75) Inventors: Oliver Dittmar, Stuttgart (DE); Tina Koehler, Heidelberg (DE); Johannes Pfeuffer, Heidelberg (DE); Harald Woerner, Wiesloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 311 days.

(21) Appl. No.: 10/643,815

(22) Filed: Aug. 18, 2003

(65) Prior Publication Data

US 2004/0117399 A1   Jun. 17, 2004

(30) Foreign Application Priority Data

Aug. 16, 2002   (DE) .................. 102 37 552

(51) Int. Cl.
| | |
|---|---|
| G06F 7/00 | (2006.01) |
| G06F 17/30 | (2006.01) |
| G06F 7/60 | (2006.01) |
| G06F 17/10 | (2006.01) |
| G06F 17/50 | (2006.01) |
| G06G 7/48 | (2006.01) |
| G06G 7/62 | (2006.01) |

(52) U.S. Cl. ............... 707/1; 707/3; 707/5; 703/2; 703/7; 703/13

(58) Field of Classification Search ............ 703/7, 703/13; 705/26
See application file for complete search history.

(56) References Cited

U.S. PATENT DOCUMENTS

| 6,108,662 A | 8/2000 | Hoskins et al. ............ 707/102 |
| 6,603,483 B1* | 8/2003 | Newman .................. 345/593 |
| 6,983,232 B2* | 1/2006 | Nguyen et al. ............... 703/7 |
| 2001/0034592 A1* | 10/2001 | Herman .................... 703/13 |
| 2003/0018542 A1* | 1/2003 | Nakano et al. .............. 705/26 |
| 2004/0122629 A1* | 6/2004 | Russell et al. ............... 703/2 |

FOREIGN PATENT DOCUMENTS

| EP | 0425404 | 8/1990 |
| EP | 0614151 | 3/1993 |
| WO | 0041123 | 7/2000 |
| WO | 0108054 | 2/2001 |
| WO | 0232651 | 4/2002 |

* cited by examiner

Primary Examiner—Mohammad Ali
Assistant Examiner—Patrick A Darno
(74) Attorney, Agent, or Firm—Davidson, Davidson & Kappel, LLC

(57) ABSTRACT

A method and a device for simulating process flows in the graphics industry and for displaying the result calculated in the simulated process flows. The method is characterized by the following steps:
  inputting and/or selecting at least one order data set
  inputting and/or selecting at least one process data set
  calculating links between order data set and process data set as a function of the order data set and the process data set
  creating a process flow from the calculated links
  calculating the result and/or intermediate results for a process flow using the underlying order data set
  outputting the result and/or intermediate results.

8 Claims, 4 Drawing Sheets

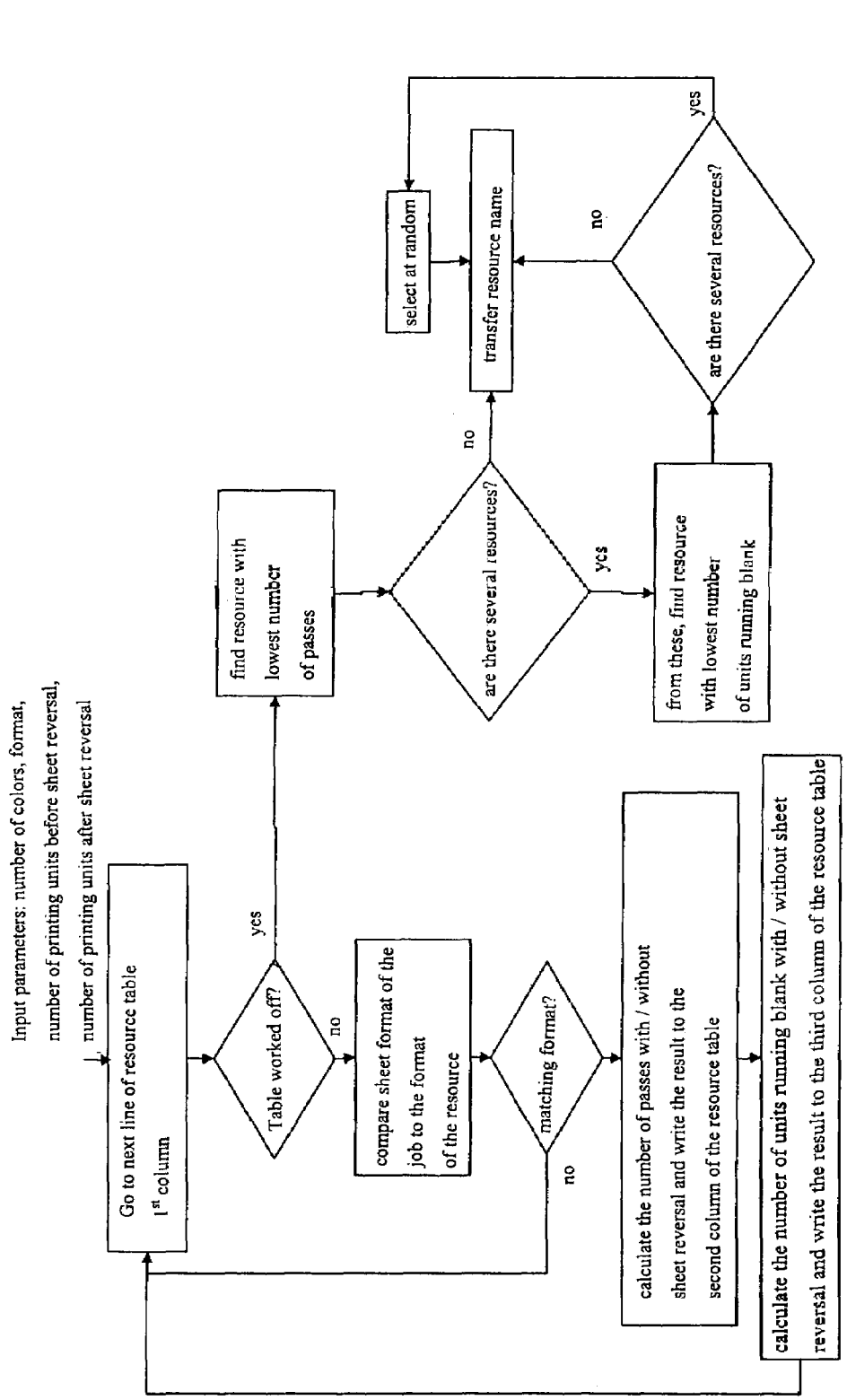

METHOD AND DEVICE FOR SIMULATING PROCESS FLOWS IN THE GRAPHIC INDUSTRY

Priority to German Patent Application No. 102 37 552.6, filed Aug. 16, 2002 and hereby incorporated by reference herein, is claimed.

BACKGROUND INFORMATION

The present invention relates to a method and a device for simulating process flows in the graphics industry and for displaying the result calculated in the simulated process flows.

Companies in the graphics industry, such as printing plants, usually have several devices, such as printing presses or machines for print finishing, such as folding machines, as well as prepress equipment, all of which will hereinafter be summed up by the term "devices of the graphics industry". Thus, jobs have to be distributed among the different available devices of the graphics industry in order to use the available devices as efficiently as possible. In this context, not every printing job requires every resource, such as a folding machine or printing press, in the same manner so that it is a difficult undertaking to coordinate different jobs distributed among several machines. The same problems arise also when a company of the graphics industry has to decide whether it pays to increase its stock of equipment to be able to process additional orders. Since a company of the graphics industry increases its stock of equipment only if it can be sure to make extra money in this manner, printing press manufacturers are forced to make profitability analyses on the utilization of new printing presses in the course of the sales consultation. In this context, it is problematic that there is a very large number of different types of printing presses, which also differ considerably in special features. In addition, due to their size, devices of the graphics industry must also take into account the specific space conditions in a printing plant.

Today, in order to solve these complex problems, the industry also uses, for example, simulation programs on a PC or laptop, the simulations programs including components in a library which make it possible, for example, to build up a production line. The machine data which, for example in the printing industry, can be set-up times, production times, and downtimes, has to be entered into these components at any one time. However, to create a process flow, the different components have to be linked together so that changes and dependencies of different orders that are distributed among several machines are taken into account.

Such a simulation program is, for example, the software "Enterprise Dynamics" of the INCONTROL company (www.enterprisedynamics.com). Here, the user can create an industrial simulation model of many components. To be able to take into account the dependencies between the components, it is necessary to create links between the components, involving considerable effort. In doing so, case-specific constellations are created from the components of, for example, the printing presses as a function of the printing jobs. Thus, in each case, a static model is developed which needs to be completely redone in the case of a change in orders or in the stock of equipment. This method turns out to be very cost-intensive and time-consuming, as a result of which, in the graphics industry, it can only be used for large projects, such as the purchase of a larger stock of equipment of a large commercial printer.

SUMMARY OF THE INVENTION

It is therefore an object of the present invention to provide a method and a device which are used for simulating process flows in the graphics industry and for displaying the result calculated in the simulated process flows, and which are inexpensive, work with models that are fast to develop, and which make do without requiring a lot of specialized knowledge of the personnel who operate the simulation method and the simulation device. In particular, the intention is for the method to be capable of being carried out also by sales representatives of a printing press manufacturer at the customer's premises.

The present invention provides a method for simulating process flows in the graphics industry and for displaying the result calculated in the simulated process flows and/or intermediate results, comprising the following steps of: inputting and/or selecting at least one order data set; inputting and/or selecting at least one process data set; calculating links between order data set and process data set as a function of the order data set and the process data set; creating a process flow from the calculated links; calculating the result and/or intermediate results for a process flow using the underlying order data set; and outputting the result and/or intermediate results.

The present invention also provides a device for simulating process flows in the graphics industry and for displaying the result calculated in the simulated process flows and/or intermediate results on a display device, comprising: at least one user interface for inputting or selecting at least one order data set; at least one user interface for inputting and/or outputting at least one process data set; at least one device suitable for calculating links between order data set and process data set as a function of the order data set and the process data set; at least one device suitable for creating a process flow from the calculated links; at least one device suitable for calculating the result and/or intermediate results for a process flow using the order data set; and at least one display or output device for displaying or outputting the results or intermediate results.

The method and device underlying the present invention links together the data of the printing jobs and the data stored for the devices of the graphics industry, thus creating a process flow in a simple and quick manner.

As in the case of the known methods heretofore, the results calculated in the process flows are then used for decision making, for example, in the case of investments.

The method is conveniently implemented as software which is executed on a PC or laptop or another computer suitable for this purpose. A so-called "process data set" containing all machine-specific data that is relevant for a process flow is stored on the computer for each printing press and each folding machine. Thus, by selecting a process data set, a particular machine is selected and vice versa. In this context, it is not only possible to select the process data sets, but also to create new machines by entering and storing the process data sets of the new machines. Then, the particular order data sets or printing jobs and process data sets or machine types are selected on the computer, preferably via a graphical user interface or entered via interfaces such as keyboard or drives with removable storage media. Logic stored in the software creates the required linkage between the process data sets and the order data sets. Once the links are calculated, it is possible to create the process flow and to start the simulation. The results and intermediate results obtained in the process in the form of job set-up times, idle times, utilization rate, number of units, etc., can then be displayed on the graphical user interface or archived on a storage medium.

In this manner, the time-consuming and cost-intensive creation of the links is immensely simplified and accelerated. In particular, sales representatives who are equipped with a laptop and software containing the method according to the present invention can now perform a simulation during consultation and sales conversations at the customer's premises in a quick and efficient manner on the basis of the local conditions at the printing plant and the machines available there. This offers decisive advantages to both the customer and the vendor because the vendor is able to provide consultation in an inexpensive and efficient manner, and because the customer receives a consultation that is equally inexpensive and efficient and tailored to his/her environment.

In a first embodiment of the present invention, provision is made for the links between order data set and process data set to be made as a function of the order data set and the process data set using an evaluation method in which, initially, a query is made as to which process data set can be used to process a selected order data set, then all positively queried process data sets are written to a resource table, furthermore, a ranking of all positively queried process data sets is established as a function of the process flow data and the order data, whereupon the process data set with the highest ranking is selected and assigned to the selected order data set. Using the first query, the logic underlying the method and device according to the present invention checks which process data sets or machine types and which order data sets or printing jobs match. Since the printing jobs or order data sets are usually defined by the printing plant, they are considered to be given, and the matching machine types are selected.

The underlying logic sorts out the machine types that are not suitable for the given job. Suitable machines types are then stored in a so-called "resource table", in which, by means of comparative queries, a ranking is established as to which machine is best suited to carry out which printing job as a function of the properties of the order data sets and the process data sets. The process data set with the highest ranking is then selected by the logic and assigned to the associated order data set. In this manner, the best possible combination of given machine types and given order data sets is determined.

A further embodiment of the present invention has the feature that the calculation of links between order data set and process data set is carried out as a function of the order data set and the process data set using a further method in which the order data sets are sequentially assigned to one or more process data sets, order data sets and corresponding process data sets are compared to each other, and the best linkage is created as a function of the specific order data set. In a printing plant, each printing job normally passes through the three stages of prepress, press and postpress or finishing. Since each individual stage is carried out by one or more suitable machines, it is required for the order data set to be checked in the individual stages for its properties to generate a appropriate process flow. In the process, the order data set is compared to the existing resources or machine types or process data sets of the stages. In this manner, the appropriate links between the order data sets and the process data sets are calculated and created.

Moreover, provision is made that an order data set contains the data needed for a printing job. Thus, using the order data set, the required data is taken from all printing jobs set up by a printing company, that is, by the customers of the printing company, and is incorporated into the method or device according to the present invention. In order to obtain as meaningful a simulation result as possible, it is therefore inevitable that all relevant data of a printing job be known to the method or device.

Great advantages result from the fact that a process data set contains the performance specifications and/or operating costs of a device of the graphics industry needed for the process flow, in particular, of a printing press or a device of the prepress stage. In this manner, the capabilities and characteristics of the devices of the graphics industry are incorporated into the inventive method or device via the process data sets, which contain all machine data relevant to the printing operation or folding operation.

In one embodiment of the present invention, provision is made that, prior to the start of the method, it is possible to access at least one process data set stored in a library. This offers the advantage that the process data set or type of printing press does not need to be entered by hand, but can be immediately integrated into the method by calling up a file in which the process data set is stored. Since the process data set in each case corresponds to one machine, this means that the data of the machines is quickly available when creating a simulation. Therefore, the files containing the process data sets can also be assigned machine icons which can easily be incorporated into the simulation method on the graphical user interface of a display device of a PC or laptop with the aid of a computer mouse or a track ball using the so-called "drag and drop" technique, that is, by clicking on and dragging icons on the graphical user interface using the computer mouse. That is, a machine of the inventory of machine types or process data sets is positioned on the user interface and thereby incorporated into the simulation method.

In a further embodiment of the present, provision is made that, prior to the start of the method, it is possible to access at least one order data set stored in a library. This offers the user of the inventive method or device the advantage of being able, through a library of order data sets, to quickly and easily call up standardized printing jobs whose data is stored in a file in a database. However, it is also possible to change parts of the order data set so that, for example, the format and paper type of a sheet remain the same, and only the number of sheets to be printed is changed. This saves the user the effort of entering the order data set by hand via the keyboard of a PC or laptop.

Moreover, provision is made for the stored process data sets to be capable of being selected and called up from a library on a display device with the aid of a graphical user interface. Furthermore, provision is made for the order data sets to be capable of being selected and called up in this manner as well. Thus, the machine types and printing jobs can be incorporated into the printing plant model by simply opening files that are selectable on the graphical user interface of the display device and using the "drag and drop" technique mentioned above.

Moreover, provision is made that the process data sets contain dimensions associated with the devices and/or that these dimensions of the devices are displayed on the display device. Thus, by the selection of a process data set and display of the associated device, i.e., the printing press, folding machine, or the pre-stage stage, the user is immediately given the possibility to check whether the devices in question can be installed in the printing plant in question at all. If the dimensions of the printing plant building are known, then the question of whether such a machine configuration can be implemented at all can be decided immediately on the spot in that the floor plans of the printing plant building, after entry into the PC or laptop, are also displayed on the graphical user interface of the display device and thus be brought into coincidence with the displayed dimensions of the selected machine types or devices. In this context, the dimensions do not need to correspond to the physical dimensions of the machine, but conveniently include a safety clearance all around the machine because ease of access to the machine is maintained in this manner. Above all, there should always be enough space between the individual machines for operation and maintenance purposes, the space being allowed for in the dimensions.

BRIEF DESCRIPTION OF THE DRAWINGS

The present invention is described and illustrated in greater detail with reference to several Figures, in which:

FIG. 4 shows a flows chart relating to the selection of process data sets for given order data sets.

DETAILED DESCRIPTION

Figure 1:
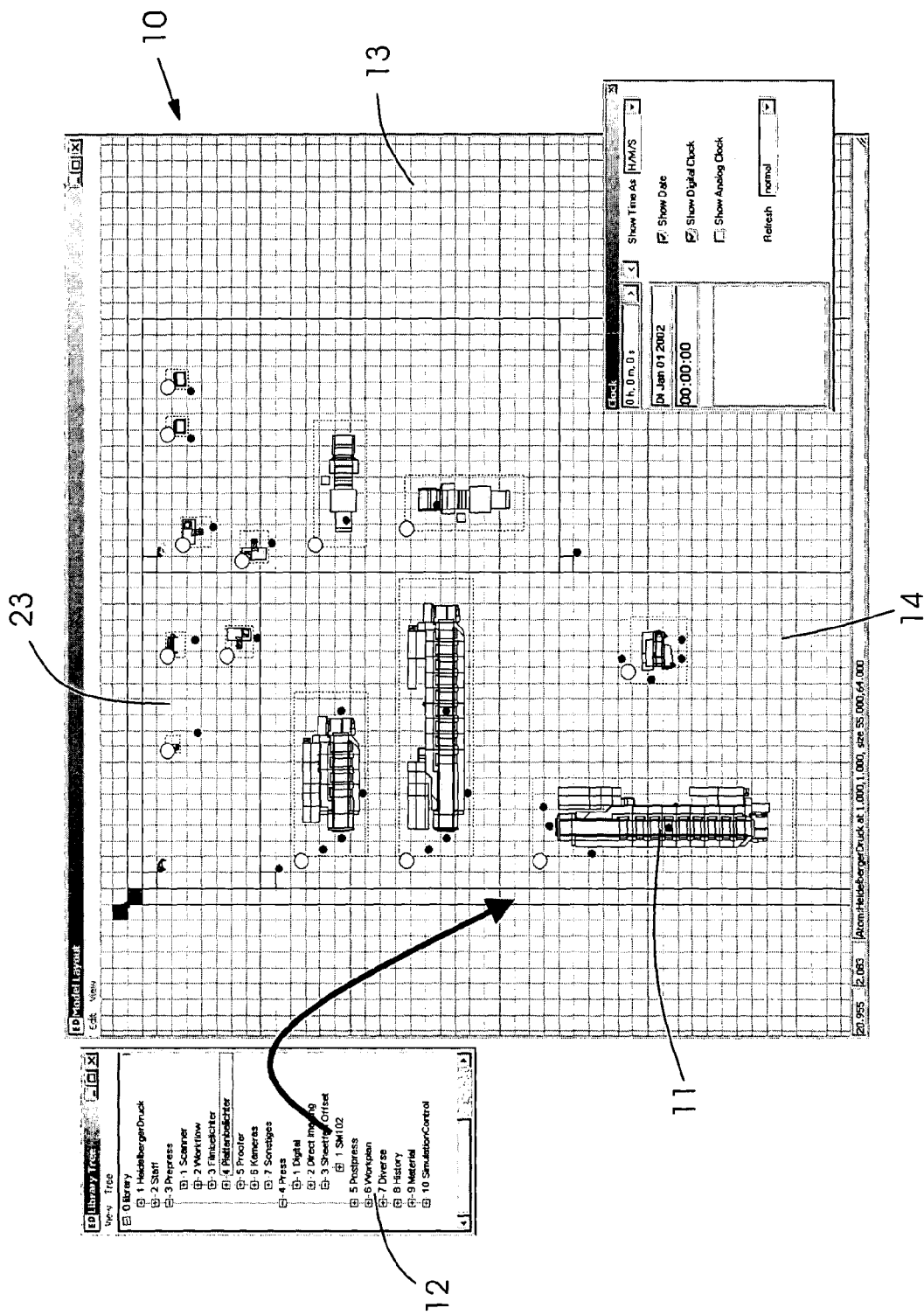
FIG. 1 shows a graphical user interface including a system of selected process data sets or machine types arranged on the floor plan of a printing plant.

The device according to the present invention includes a computer such as a PC or laptop which are suitable to carry out the method according to the present invention. In the embodiment shown in FIG. 1, the operating system used for the computer is Windows 2000; however, it is also possible to choose a different operating system in which case the software containing the method according to the present invention has to be adapted accordingly. In FIG. 1, the method according to the present invention is implemented as application software that uses the typical Windows layout of a graphical user interface 10 to offer the user a familiar environment on the display device of his/her computer, e.g., the monitor. Furthermore, the basis used for the application software is a simulation program called "Enterprise Dynamics" of the INCONTROL company, this program being basically suitable for simulating processes in industry. Consequently, the possibilities available in this simulation program form the basis for the method according to the present invention. Using the mentioned simulation program, it is possible to model and then simulate process flows in industry. However, the links between the individual components, which are actually the crucial parts of the simulation model, have to be made by hand; that is, the user has to create the relationships and thus the required links in the simulation model himself/herself so that the development of such a model and the subsequent simulation requires very much time in known methods heretofore.

FIG. 1 shows a graphical user interface 10 which is based on "Enterprise Dynamics" and which was enhanced with the properties of the method according to the present invention. Graphical user interface 10 contains several windows via which data can be entered or selected for the simulation. One window contains a library 12 from which different devices of the graphics industry such as printing presses, folding machines or devices of the prepress stage can be selected. By clicking with a mouse pointer of a computer mouse on the selected object in library 12, this object can be dragged into simulation window 13 and positioned there. Simulation window 13 in FIG. 1 shows the floor plan 14 of a printing plant in which is installed, inter alia, a printing press 11. This printing press is dragged from library 12 to floor plan 14 of the printing plant using the mentioned "drag and drop" technique, that is, by dragging objects which represent, for example, a printing press 11. The other machines indicated in FIG. 1 are positioned in simulation window 13 in the same manner. Thus, simulation window 13 gradually contains the complete model 23 of a printing plant. Thus, printing plant model 23 contains one or more devices of the graphics industry.

In a database 22 are stored not only the operating data of printing machine 11 and the other devices from library 12, such as the number of sheets to be printed per hour, set-up times, consumables, operating costs, etc., but also the associated spatial dimensions of printing press 11. In this context, these dimensions represent the minimum space required for a machine; that is, additional space required for maintenance and ease of access is taken into account here as well. Consequently, the dimensions stored in database 22 are slightly larger than the purely physical dimensions of a machine. The scale floor plan 14 of a printing plant present on simulation interface 13 makes it possible to check whether there is actually enough space for selected printing press 11 in the premises of the printing plant, i.e., on floor plan 14. Printing presses 11 and the other devices can be arbitrarily positioned on floor plan 14, in connection with which the simulation software conveniently has a function which makes it impossible for printing presses 11 and other devices of the graphics industry to overlap and, of course, also to penetrate walls of floor plan 14. In this manner, the actual space conditions of a printing plant are also taken into account in printing plant model 23.

Figure 2:
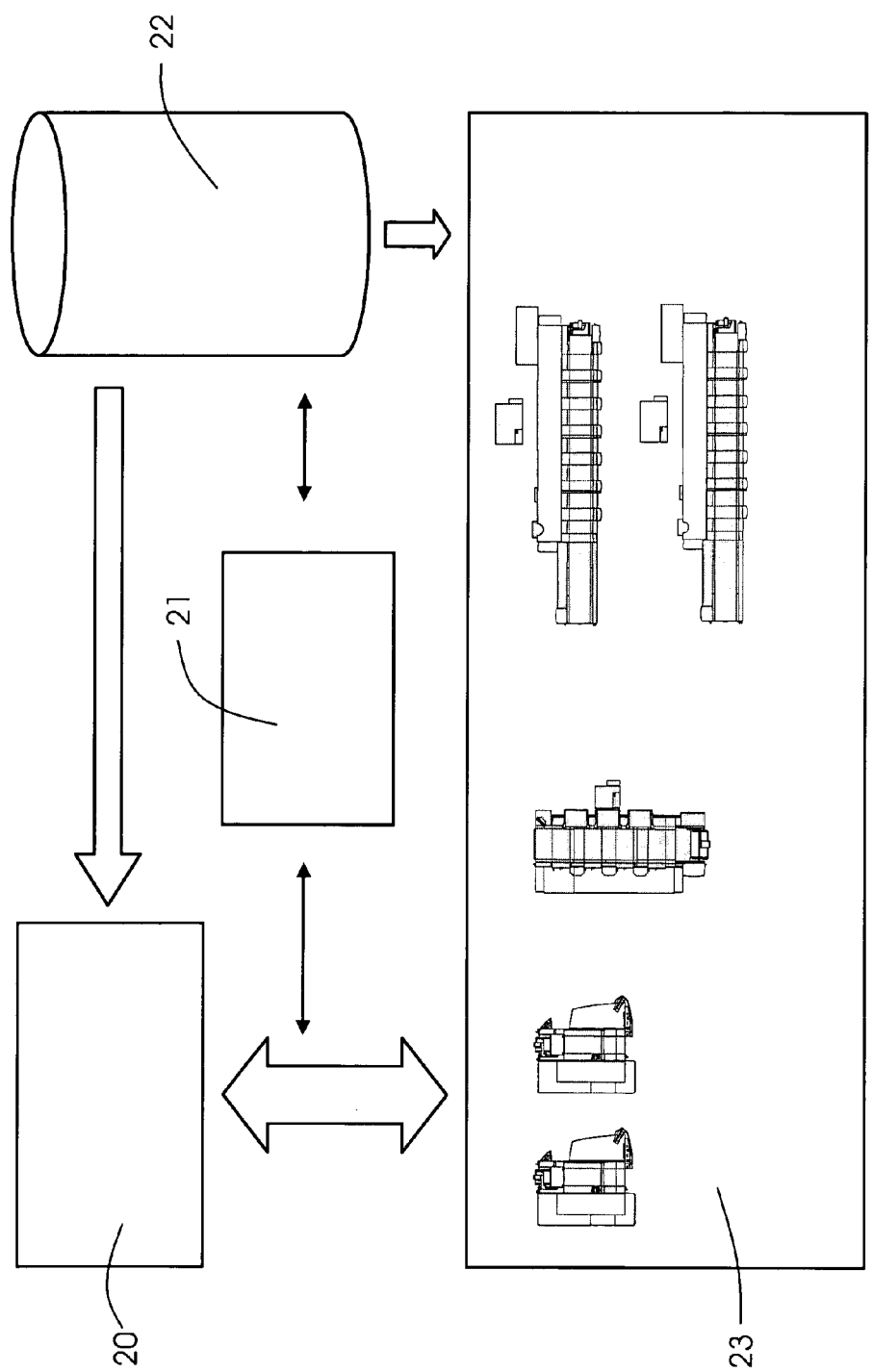
FIG. 2 is a schematic structural diagram of the method according to the present invention.

The fundamental architecture of the method according to the present invention is shown schematically in FIG. 2, which also reveals the great advantage of the inventive method over the prior art. In a database 22 are stored not only the different performance specifications of the individual machine types such as printing presses 11, but the simulation results, partial results, and printing jobs 20 to be processed are stored as well. Thus, all data required for the simulation is stored in database 22. Suitable machines are selected from library 12 along with their data stored in database 22, and a printing plant model 23 is built on graphical user interface 10, as shown in FIG. 1. Also selected from database 22 are printing jobs 20 which represent the printing jobs to be simulated. During the simulation, printing jobs 20 must be processed by the machines available in printing plant model 23. To this end, a control logic 21 must link printing plant model 23 with the printing jobs 20 so that an optimum simulation process is ensured. In this context, the linkage of machines and printing jobs is made using the methods shown in FIGS. 3 and 4. These methods represent control logic 21, which is implemented on the computer. Besides the data of the machines and printing jobs 20, which are present in database 22 anyway, further printing jobs 20 or printing presses 11 can be entered via the input devices of the computer, i.e., the keyboard or drives with removable storage media, and stored in database 22 as well. Moreover, printing jobs 20 and the performance specifications of printing presses 11 present in the database can be modified through input, and the modified printing jobs 20 or printing presses 11 can be stored as well. This gives the user the necessary flexibility when a printing plant contains machine types that have custom-made features or are one-offs.

For the sake of simplicity, access to the data stored in database 22 is via library 12 which permits a clear representation on graphical user interface 10.

Figure 3:
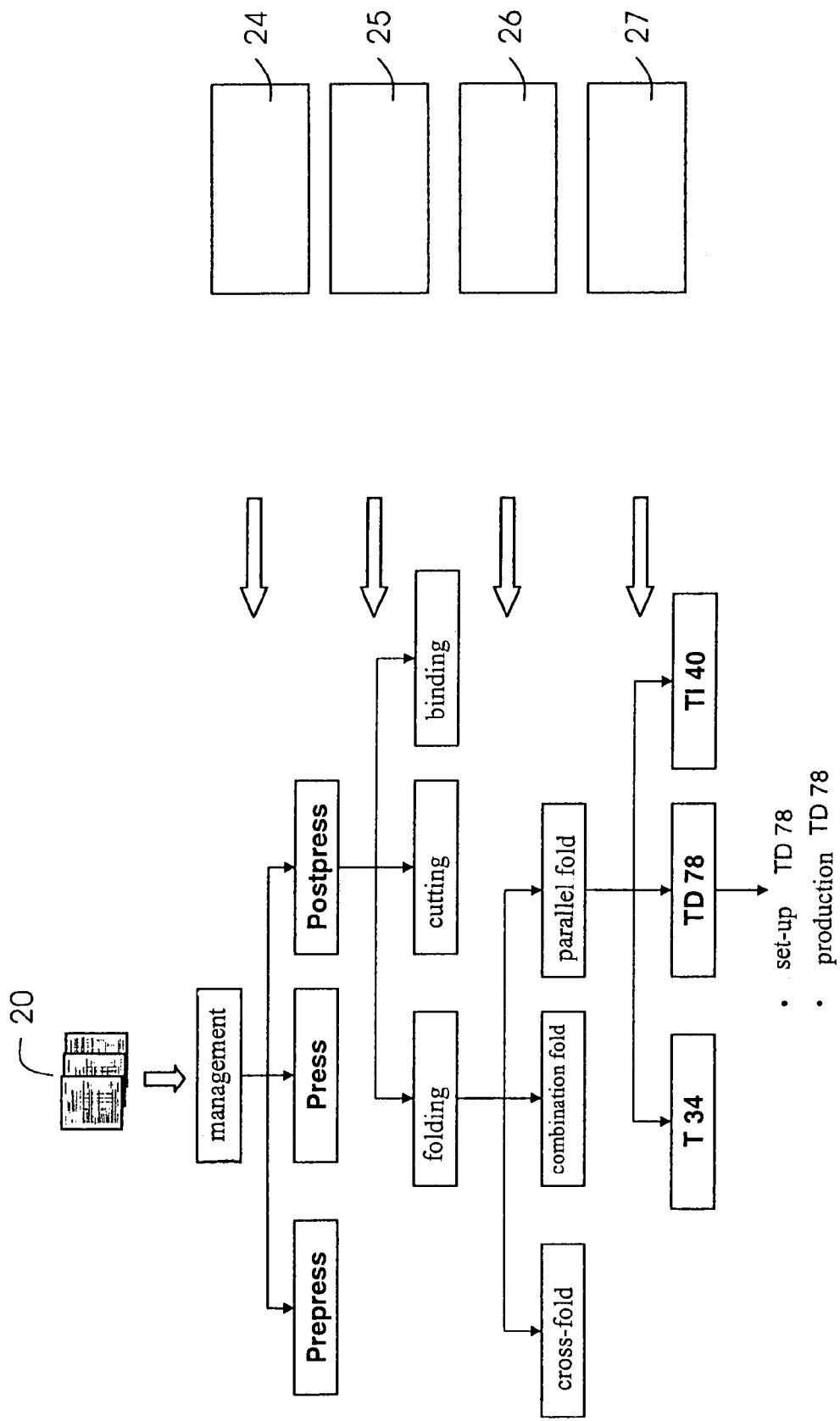
FIG. 3 is a flow chart to illustrate the links between process data sets and order data sets.

Using the method shown in a flow chart in FIG. 3, it is possible to distribute printing jobs 20 among the machines contained in printing plant model 23. To this end, the data management contained in control logic 1 assigns printing job or jobs 20 to the areas of prepress, press, and postpress at a first level 24 in a sequential manner, i.e., one after another, on the basis of their data, i.e., the order data sets. For this purpose, logic 21 contains the required selection criteria to be able to correctly assign the data present in the order data sets of printing jobs 20 to the respective areas, i.e., the process data sets. FIG. 3 shows second level 25 for the postpress area, where the order data sets in the postpress area are assigned to the processes of folding, cutting and binding. At a third level 26, order data sets pass through the further sub-areas of cross-fold, combination fold, and parallel fold. FIG. 3 shows, for the selection of resources 27 at the fourth level, which resources or machine types are eligible for making the parallel fold. Here, the resources that are capable of carrying out the process of parallel folding are the folding machine types T 34, TD 78 and TI 40 available from Heidelberger Druckmaschinen AG. Then, logic 21 selects the resource that is best suited to carry out the process of third level 26. In FIG. 3, folding machine TD 78 is selected, which is thus responsible for this part of the simulation. The exact manner in which the best-suited resource is selected is illustrated by way of example in FIG. 4.

In this context, it is crucial for the development of simulation model 23 of a printing plant that the order data sets are distributed to the process data sets and thus to the recourses in such a manner that each resource is utilized as a function of its characteristics, whereby a match with reality is given. In this context, in particular, the temporal relationships are also taken into account if several printing jobs 20 run in parallel and, possibly, a sequence of printing jobs 20 must be provided for optimum utilization of the resources.

FIG. 4 shows a flow chart of the method according to the present invention for the press area, in which flow chart the appropriate resource or printing press 11 is selected on the basis of the data of a printing job 20. In this context, printing job 20 determines the minimum requirements to be met by a printing press 11 to be eligible as a process data set for a simulation at all. A number of minimum requirements, such as number of colors, format, number of printing units before the sheet reversal and number of printing units after the sheet reversal, are specified in FIG. 4. All printing presses 11 meeting the requirements are written to a resource table that is created and stored on the computer. Thus, printing presses 11 that do not meet the requirements are not listed in the resource table and excluded from the simulation.

In a first step, the sheet format of printing job 20 is in each case compared to the process data sets of printing machine 11, and printing presses 11 or process data sets that can cope with this sheet format are written to the first column of the resource table. Next, the specific number of passes with or without sheet reversal is calculated for printing machines 11 listed in the first column of the resource table, and the result is written to the second column of the resource table. In addition, the number of idling printing units are calculated for each case and each machine type, and this result is also stored in the resource table in a third column. Logic control 21 selects the resource or printing press 11 having the lowest number of passes from the resource table if there is only one resource that meets this requirement. In the case of two or more equivalent resources, the number of idling printing units is taken into account as well, and then the resource is selected that has the lowest number of idling printing units. If then there are still equivalent resources, a resource is selected using a random number generator and transferred to printing plant model 23 as the selected process data for the simulation. However, if, in the case of simultaneous utilization, no more free resources are available, a queue must be created instead, applying the same priorities as in the case of direct selection of resources.

Thus, it is evident from FIGS. 3 and 4 that, using the method and device according to the present invention, the user who wishes to perform a simulation of processes in the graphics industry is enabled to develop a printing plant model 23 without himself/herself having to associate and link together printing jobs 20 or order data sets and the devices of the graphics industry or process data sets. The present invention relieves the user from this time-consuming work. In this manner, a printing plant model 23 can be quickly changed, allowing different scenarios to be simulated in a short period of time.

List of Reference Numerals
10 graphical user interface
11 selected printing press with minimum space requirement
12 library
13 simulation window
14 floor plan of a printing plant
20 printing job
21 control logic
22 database
23 printing plant model
24 selection at the first level
25 selection at the second level
26 selection at the third level
27 selection of resources as a fourth level

What is claimed is:

1. A method for simulating process flows in the graphics industry and for displaying the result calculated in the simulated process flows and/or intermediate results, comprising the steps of:

inputting or selecting at least one order data set representing a print job via a user interface of a computer;

selecting process data sets representing machines via a graphical user interface, the process data sets representing the machines being stored in a library, the print job determining minimum requirements to be met by a machine to be eligible as a process data set for a simulation and excluding machines that do not meet the requirements from the simulation;

distributing the at least one order data set among the selected process data sets;

calculating links between the order data set and the process data sets as a function of the order data set and the process data set;

wherein the calculating of the links between the order data set and the process data set includes an evaluation method, the evaluation method including making a query as to which process data set is capable of processing an input or selected order data set of the at least one process data set so as to define positively queried process data set; writing the positively queried process data sets to a resource table; establishing a ranking of the positively queried process data sets as a function of the process flow data and the order data set; selecting the process data set with a highest ranking; assigning the process data set with the highest ranking to the selected order data set;

creating a process flow from the calculated links;

calculating results or intermediate results for the process flow using the order data set; and outputting the results or intermediate results on a display of the computer.

2. The method as recited in claim 1 wherein the calculating of the links between order data set and process data set includes a further method, the further method including sequentially assigning one of the order data sets of the at least one order data sets to one or more of the process data sets; comparing the order data sets and assigned process data sets to each other; and in each case creating a best linkage as a function of the order data set.

3. The method as recited in claim 1 wherein the process data set contains performance specifications or operating costs of a device of the graphics industry needed for the process flow.

4. The method as recited in claim 3 wherein the device is a printing press or a prepress device.

5. The method as recited in claim 1 wherein prior to inputting or selecting steps, access to the at least one order data set stored in a library is provided.

6. The method as recited in claim 1 wherein the order data sets can be selected and called up from a library on a display device with the aid of a graphical user interface.

7. The method as recited in claim 1 wherein the process data sets contain dimensions associated with graphics industry devices or the dimensions associated with the devices are displayed on a display device.

8. A device for simulating process flows in the graphics industry and for displaying the result calculated in the simulated process flows or intermediate results on a display device, comprising:

at least one user interface for inputting or selecting at least one order data set representing a print job, the print job determining minimum requirements to be met by a machine to be eligible as a process data set for a simulation;

at least one graphical user interface for selecting process data sets representing machines;

at least one computer for excluding machines that do not meet the requirements of the print job from the simulation and for distributing the at least one order data set among the selected process data sets and for calculating links between order data set and process data sets as a function of the order data set and the process data sets;

wherein the calculating of the links between the order data set and the process data set includes an evaluation method, the evaluation method including making a query as to which process data set is capable of processing an input or selected order data set of the at least one process data set so as to define positively queried process data sets; writing the positively queried process data sets to a resource table; establishing a ranking of the positively queried process data sets as a function of the process flow data and the order data sets; selecting the process data set with a highest ranking; and assigning the process data set with the highest ranking to the selected order data set;

the computer for creating a process flow from the calculated links;

the computer for calculating the result or intermediate results for the process flow using the order data set; and a display for displaying the results or intermediate results.

* * * * *